H. W. RANSDALL.
METALLIC PISTON PACKING.
APPLICATION FILED DEC. 31, 1914.
1,178,101.
Patented Apr. 4, 1916.
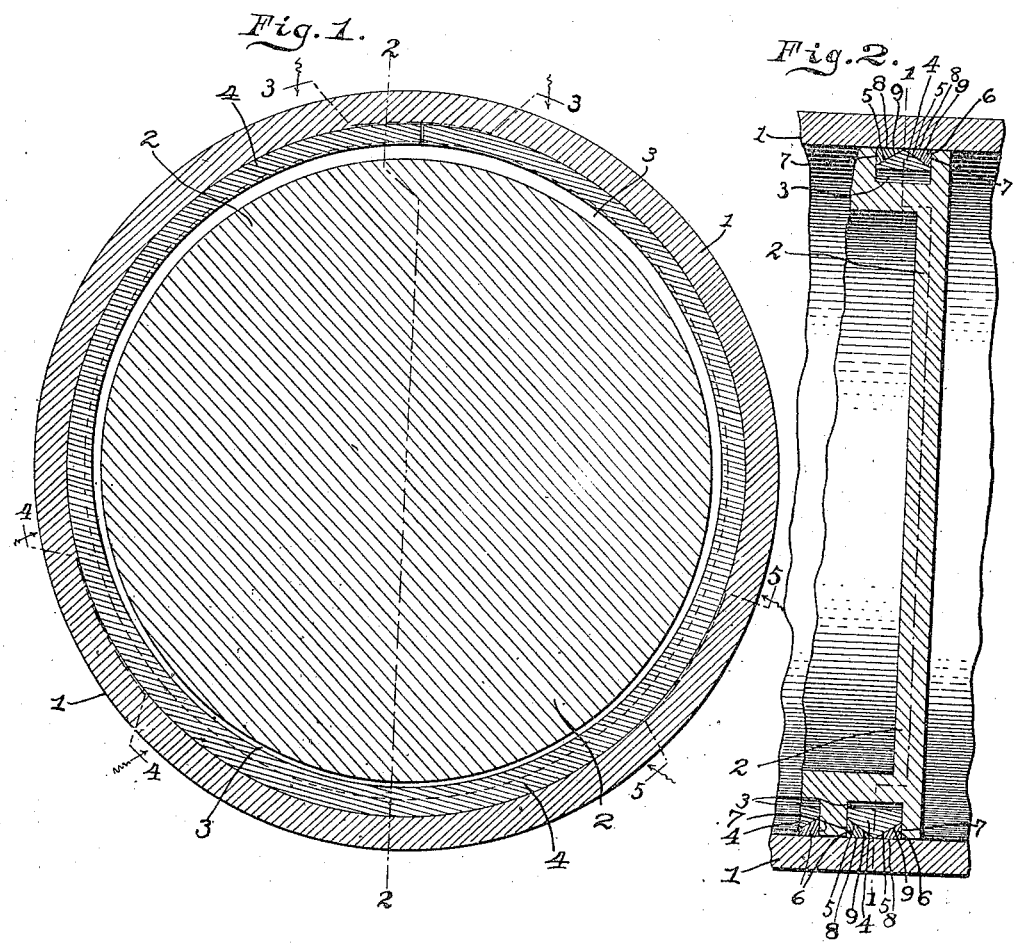
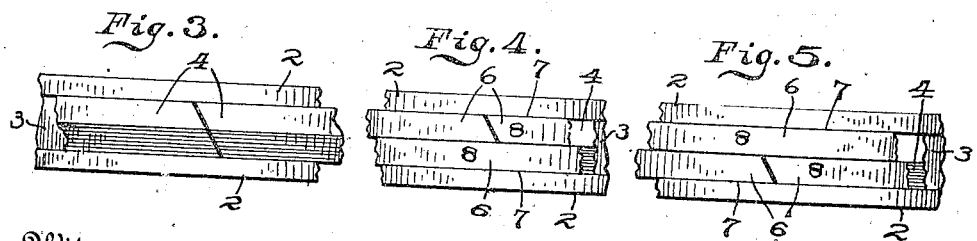

UNITED STATES PATENT OFFICE.

HARRY W. RANSDALL, OF INDIANAPOLIS, INDIANA, ASSIGNOR, BY DIRECT AND MESNE ASSIGNMENTS, OF ONE-THIRD TO THEODORE A. MEYER AND ONE-THIRD TO LAURENCE J. EBY, BOTH OF INDIANAPOLIS, INDIANA.

METALLIC PISTON-PACKING.

1,178,101. Specification of Letters Patent. Patented Apr. 4, 1916.

Application filed December 31, 1914. Serial No. 879,831.

*To all whom it may concern:*

Be it known that I, HARRY W. RANSDALL, a citizen of the United States, residing at Indianapolis, Marion county, and State of Indiana, have invented and discovered certain new and useful Improvements in Metallic Piston-Packings, of which the following is a specification.

My invention relates to pistons and its object is to provide packing rings of an effective character conforming to a cylinder of worn or irregular surface, thus tightly closing the cylinder against leakage of gas past the piston.

With this end in view my invention is embodied in preferable form in the device hereinafter described and illustrated in the accompanying drawings.

In these drawings, Figure 1 is a central cross section of the piston on line 1—1 of Fig. 2; Fig. 2 a section on line 2—2 of Fig. 1; Fig. 3, a detailed enlarged sectional plan of expander ring on line 3—3 of Fig. 2; Fig. 4, a detail sectional plan of packing rings on line 4—4 of Fig. 2; and Fig. 5 a detail enlarged sectional plan on line 5—5 of Fig. 2.

I am aware that it has heretofore been proposed to use metallic packing rings on a piston arranged with two outer rings adapted to bear against the cylinder wall and an inner so-called spreader ring, but in these constructions the outer and inner rings have been of the same thickness and same resiliency. With such an arrangement, if the spreader ring is stiff enough to provide an effective expansive action and the outer rings of the same strength, such outer rings will be too stiff to be conformed to an irregular cylinder at all points, while if both sets of rings are made so light as to obtain the capacity for conforming to the cylinder, the inner ring will not possess sufficient expansive force. These objections are sought to be overcome by my invention.

Referring to the drawings, 1 designates the wall of a cylinder in which the piston 2 is adapted to move. This piston is provided with a circumferential groove 3. In this groove is seated a split spring ring 4 preferably of semi-steel adapted to constitute the sole expanding means for the packing members. This ring is made thickest at a point diametrically opposite the split, and tapers therefrom to the free ends, in order that the ring shall be of uniform resilience and that it shall be sufficiently yielding at the end portions. This ring when closed at its ends by insertion of the piston within the cylinder is of slightly greater interior diameter than that of the circumferential wall of the groove, whereby the ring is held slightly spaced from said wall under all conditions. The outer face of the ring has inclined faces 5, meeting at the center and providing a wedge shaped peripheral surface.

Mounted within the groove and having interior bearing against the expander ring and exterior bearing against the wall of the cylinder are metallic packing rings 6. These rings are thin flexible strips of metal cut from an iron casting in circular form, and split. They possess no spring action apart from that due to the natural tendency of the cast, split, metal strip to yield and expand circularly. They are of uniform thickness throughout. The rings are of less thickness than the expander ring and are made sufficiently light and thin to enable them to bend readily on a short radius at any portion of their circumferences and thus to conform closely to any irregularity in the cylinder. The pressure of the packing rings against the cylinder to obtain this close contact therewith is obtained solely by the pressure of the stronger spring ring 4.

Each ring has a radial side wall 7 which bears against the adjacent side wall of the groove in the piston, and which walls at all times serve to close the groove against the entrance of gas, but are no longer than necessary to merely perform this function. The outer edge of each such side wall of the ring joins a flat peripheral base wall 8, which bears against the surface of the cylinder. The inner edges of the peripheral faces of the two packing rings meet at the center line. The size and tension of the expander ring 4, and the length of the side walls 7 are such that the outer edge of the expander ring at no time projects against the wall of the cylinder.

The side and peripheral walls of each packing ring are joined by a continuous inclined wall 9, which meets the side and face walls at sharp acute angles.

The operation of the piston is as follows:—To assemble the parts, the expander ring and the packing rings are sprung into the groove in the piston and the piston inserted in the cylinder. The pressure of the wall against the packing rings will contract them so that their ends almost touch and this pressure will be communicated to the spring expander forcing its ends together and imposing a tension on said expander. The expander when in contracted position being separated slightly from the inner wall of the groove, has a contracting and expanding play within the groove which will serve to press the packing rings closely against the wall of the cylinder at all points thereof whether the surface be regular or irregular. Owing to the thin cross section of the packing rings, they are yieldable at localized portions of their circumference on arcs of short radii and hence will be forced to conform to the wall of the cylinder throughout the entire area thereof, the expander ring serving to force the packing rings outwardly by its spring action into any eccentric outward extension of the cylinder wall and to move toward the center of the piston to yield to any inward projection from the true circle of the cylinder.

The packing rings are of low cost, easily applied and may be readily replaced when they become worn.

Having thus described my said invention, what I claim is:

1. In combination with a piston, thin metallic circular packing rings of uniform thickness throughout yieldable on short segments of their circumferences, and an inner eccentrically tapered expander ring adapted to force the packing rings outwardly.

2. In combination with a piston having a groove, a continuous spring expander ring of comparatively stiff metal mounted in said groove and of a width to fill the opening of the groove, said ring having outer inclined faces, outer triangular metallic packing rings each having an inclined face fitting a face of the expander ring, each of said outer rings being of thin cross section and less in thickness than the expander ring.

3. In combination with a piston having a groove, a spring expander ring seated in said groove and spaced from the inner wall thereof and having inclined outer faces, a pair of outer metallic packing rings triangular in form and fitting said expander ring faces, said outer rings being of thin cross section and yieldable at local points on short segments to conform to the wall of the cylinder and said expander being thicker than the outer rings and extending farther into the groove than the outer rings at all points of its circumference.

4. In combination with a piston having a groove, metallic triangular, circular, split packing rings of such thinness as to be capable of readily yielding on short segments of their circumferences, said rings being mounted in said groove, an inner expander member consisting of a split spring ring thickened eccentrically from its ends to a point opposite said ends, said expander ring extending across the width of the groove and having inclined outer faces fitting the inner faces of the outer rings and having side walls extending inward parallel to the sides of the groove from the base line of the inclined walls of the outer rings and having an inner wall joining the side walls and parallel with the inner wall of the groove.

5. In combination with a piston having a groove, an expander ring mounted in said groove and having exterior inclined faces, metallic packing rings of smaller cross section than the expander ring and of such thinness as to be yieldable on a short radius at any part of their circumferences so as to be capable of conforming at all points to irregularities in the cylinder wall when pushed outwardly by the expander spring, said expander being eccentrically formed and the packing rings circular, and said expander ring being spaced from the inner wall of the piston groove, substantially as described.

In witness whereof, I have hereunto set my hand and seal at Indianapolis, Indiana, this 16th day of November, A. D. nineteen hundred and fourteen.

HARRY W. RANSDALL. [L. S.]

Witnesses:
A. C. RICE,
H. P. DOOLITTLE.